United States Patent [19]

Bowden

[11] Patent Number: 5,095,769
[45] Date of Patent: Mar. 17, 1992

[54] SAFETY CONTROL DEVICE

[75] Inventor: Michael Bowden, Durham, United Kingdom

[73] Assignee: Electrolux Northern Limited, Co. Durham, England

[21] Appl. No.: 506,176

[22] Filed: Apr. 9, 1990

[30] Foreign Application Priority Data

Apr. 17, 1989 [GB] United Kingdom ............... 8908633

[51] Int. Cl.$^5$ .................................... A01D 75/20
[52] U.S. Cl. .................................. 74/480 R
[58] Field of Search ............... 74/480 R, 479, 489, 74/483; 56/10.5, 10.8, 10.2, 11.3, 11.4

[56] References Cited

U.S. PATENT DOCUMENTS 4,573,307  3/1986  Wick ..................... 74/480 X

*Primary Examiner*—Richard E. Moore
*Attorney, Agent, or Firm*—Thomas J. Greer, Jr.

[57] ABSTRACT

The invention relates to a safety control device for operator-presence controls, particularly for lawnmowers.

The device disclosed comprises a movable control lever (20) linked to a deadman handle (28) by a pin (36) which is movable relative to a guide slot (44). The guide slot (44) has one or more recesses (46,48) which receive the pin (36) to prevent movement along the slot.

When the pin (36) is in recess (46), the control lever (20) is locked into an inoperative position. Conversely, when the pin (36) is in recess (48) the control lever (20) is locked into an operative position. The control lever (20) and the deadman handle (28) are biased to assume respective inoperative positions when released.

13 Claims, 3 Drawing Sheets

SAFETY CONTROL DEVICE

This invention relates to a safety control device for controlling potentially hazardous machines such as lawnmowers, chain saws and the like.

There have been many instances of serious injury due to incorrect use of potentially hazardous machines, especially in domestic environments and by unskilled operators. Cutting machines with blades, such as lawnmowers or powered saws, are particularly dangerous because the blades may operate unexpectedly if the machine's control lever is accidentally knocked. Furthermore the blades may continue to operate even after the control lever has been released.

In view of the foregoing, safety control devices have been proposed to ensure that operation cannot take place until so intended by the operator. The following are acknowledged features of safety control devices:

(i) a system which requires the performance of two completely distinct actions to start the machine, to reduce the risk of inadvertent operation due to knocks.

(ii) a control lever which is biased to assume a rest position in which the machine is inoperative. The machine cannot operate unless the operator holds the lever against the biasing force away from its rest position. Consequently, the machine is stopped when the operator releases the control lever. This is similar to the 'dead-man's handle' arrangement used for many years in trains and the like.

Legislation has been proposed to make both of these precautions mandatory. An example is ISO 5395, which includes provisions relating to so-called 'operator-presence controls' for lawnmowers.

Known safety control devices are complex and therefore tend to be unreliable and expensive. Moreover, known devices can be awkward and uncomfortable to use, particularly where the operator has to apply considerable pressure to the dead-man's handle.

An object of this invention is to overcome or at least to mitigate the drawbacks of existing safety control devices.

According to this invention, a safety control device comprises a movable control element linked to a deadman handle by a member which is guided for relative movement along a path, wherein the path has at least one portion in which relative movement between the path and the member is restricted.

In a preferred embodiment, the path has a first recess positioned such that, when the member is engaged therein, the control element is restrained in a non-operative position. Suitably, the control element is biased towards its non-operative position, and the deadman handle is biased in such a way that the member is urged into the first recess when the deadman handle is released.

Advantageously, the path has at least one second recess positioned such that, when the member is engaged therein, the control element is restrained in an operative position. There may be a plurality of second recesses spaced apart from one another along the path. In a preferred embodiment, the device is arranged such that the member is urged into the second recess as a consequence of the deadman handle being held in an operative position.

Embodiments of this invention will now be described, by way of example, in relation to a lawnmower.

Reference is made to the accompanying drawings in which.

Figure 1:
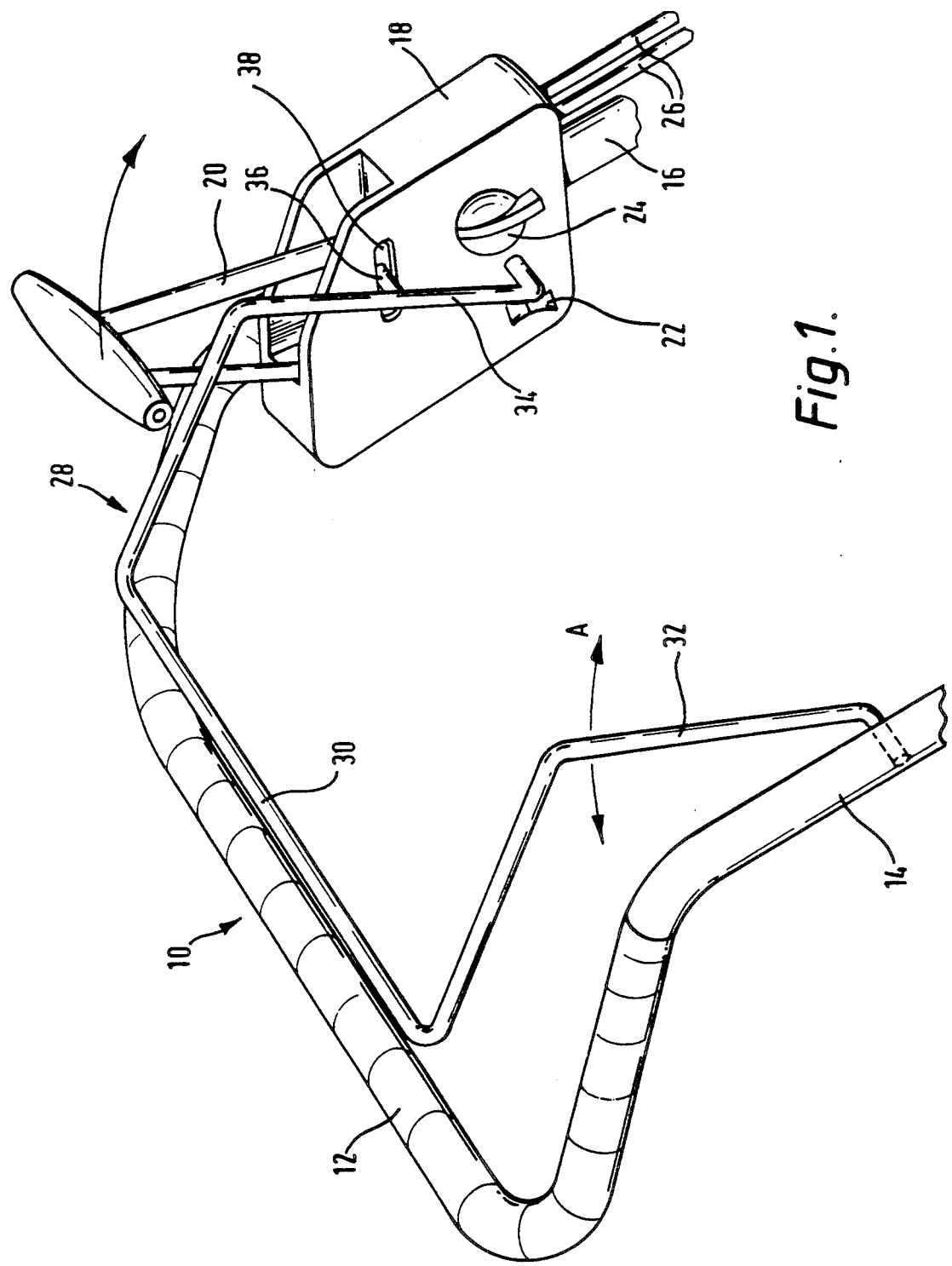
FIG. 1 is a schematic perspective view showing the handle portion of a lawnmower fitted with the device of this invention.

Referring to FIG. 1, a lawnmower has a body (not shown) and a lawnmower handle 10 for pushing and/or guiding movement of the lawnmower by an operator. The lawnmower handle 10 is of conventional design, being of tubular section and having a handgrip 12 which lies substantially horizontally. In the usual way, two side arms 14, 16 connect the handgrip 12 to the lawnmower's body.

A control box 18 is attached to the side arm 16 in a position which affords convenient access to an operator. For safety and convenience, the control box 18 carries at least those control devices which may have to be reached quickly by the operator during normal use. With this in view, the control devices carried by the control box 18 include a control lever 20, an engine kill switch 22 and a throttle override 24.

The lawnmower is powered by an internal-combustion engine and the control lever 20 actuates a clutch/brake mechanism designed to start and stop the lawnmower's blade.

The various control devices are connected to components within the lawnmower's body by means of cables and/or wires 26, which lie outside the tubular arm 16 as shown.

The lawnmower has a deadman handle 28 which is broadly similar in shape to the lawnmower handle 10, having a straight handle portion 30 and two kinked arms 32, 34. One arm 32 is pivotally attached at its end to side arm 14, and the other arm 34 is pivotally attached at its end to the control box 18.

As shown by the arrow in FIG. 1, the handle portion 30 is movable between an operative position adjacent to the handgrip 12, and a rest position remote from the handgrip 12. The deadman handle 28 is biased so as to assume the rest position when released by an operator and, as will be explained, the lawnmower is designed to stop when the deadman handle is in the rest position.

When the deadman handle 28 is in the rest position, the handle portion 30 is approximately 10 cm from the handgrip 12. This allows the operator to grasp the deadman handle 28 while holding the lawnmower handle 10.

The arm 34 of the deadman handle 28 carries a pin 36 which enters the control box 18 through a slot 38. The deadman handle interacts with the control lever 20 via the pin 36, as will now be explained.

Figures 2, 3, 4:
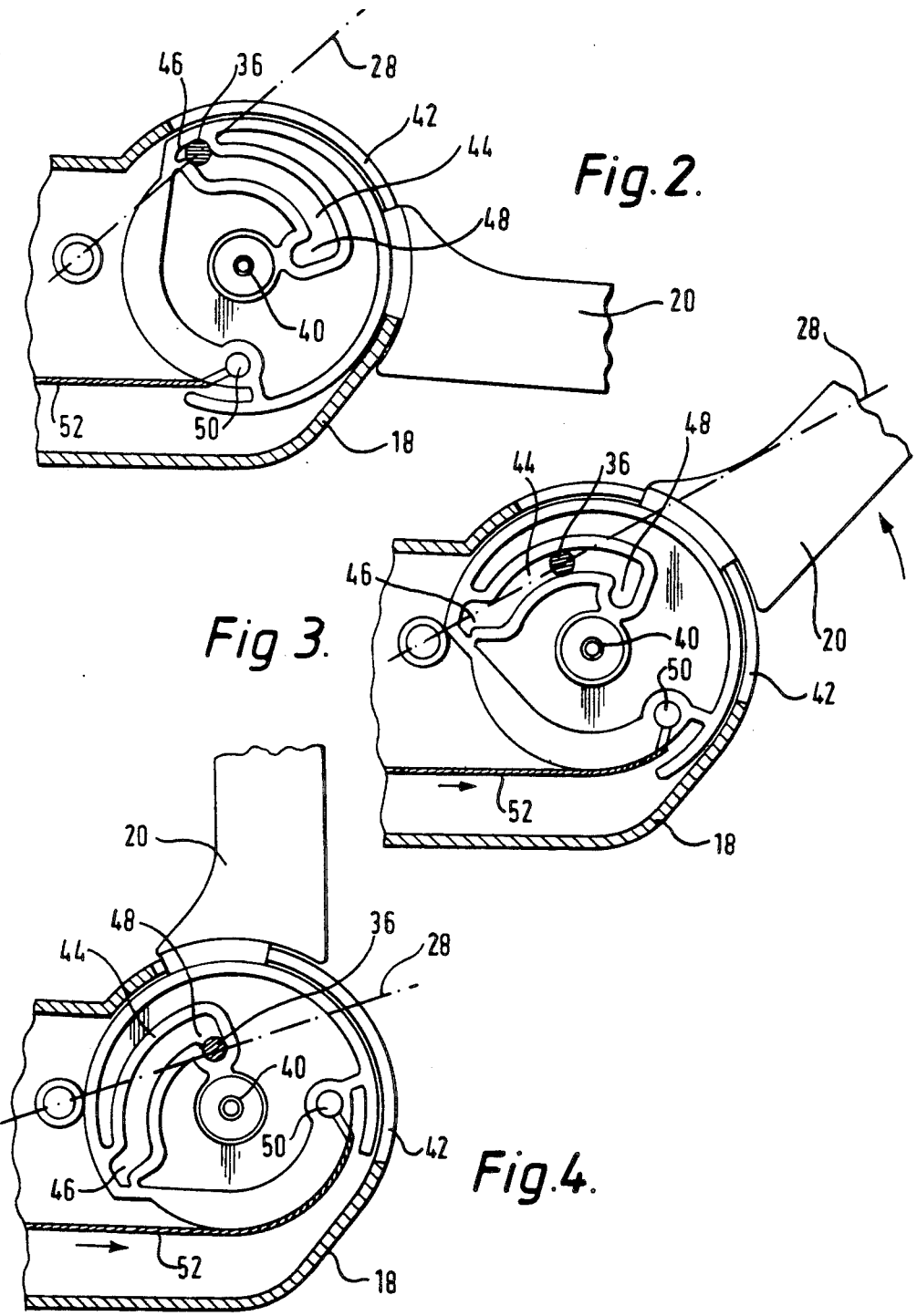
FIGS. 2, 3 and 4 are schematic sectional side views showing a detail of a preferred embodiment.

As shown in FIGS. 2, 3 and 4, the control lever 20 is attached to the control box 18 by a pivot 40. The control lever 20 moves within a slot 42 provided in the casing of the control box 18, and the ends of the slot 42 define the range of movement of the control lever. The base of the control lever 20 has a shaped guide slot 44 which receives the pin 36.

FIG. 2 shows the control box 18 in a situation where the deadman handle 28 (represented by a dotted line) has been released and has, therefore, assumed its rest position. The biasing force acting upon the deadman handle 28 acts upwardly as represented in the drawings. The control lever 20 is also shown in its rest position, in which the lawnmower is inoperative. The biasing force acting upon the control lever 20 acts in a clockwise direction as represented by the arrow in FIG. 1.

When the control lever 20 and the deadman handle 28 are in their rest positions as shown in FIG. 2, the pin 36 is at one end of the guide slot 44. This end of the guide slot 44 (the left-hand end as illustrated) has an outwardly-facing recess 46 and the pin 36 is urged into this recess as a consequence of the biasing force acting upon the deadman handle 28. Engagement of the pin 36 within the recess 46 locks the control lever 20 in its rest position. Consequently, the control lever 20 cannot assume an operative position even if it is accidentally knocked.

The device of this invention satisfies the requirement that two separate actions must be performed to activate the lawnmower. This is because the control lever 20 can be moved to activate the lawnmower only by firstly moving the deadman handle 28 out of its rest position so as to disengage the pin 36 from the recess 46. As shown in FIG. 3, the pin 36 can then follow the curved main portion of the guide slot 44 as the control lever 20 is moved through intermediate positions in its range of movement.

As will be clear, the biasing force acting upon the control lever 20 will return the lever to its rest position if the lever is released. This may be inconvenient, especially if the operator must apply a heavy load to the control lever 20 for the lever to remain in a given position. This problem is overcome in the illustrated embodiment, as shown in FIG. 4.

FIG. 4 shows the control lever 20 in a 'fully-on' position at the end of its travel. In this position, the pin 36 is at the right-hand end of the guide slot 44, which end has an inwardly-facing recess 48 into which the pin 36 is urged to lock the control lever 20 into the fully-on position. The control lever 20 is, therefore, prevented from returning to its rest position and can only be released by the operator.

The pin 36 is urged into the recess 48 when the deadman handle 28 is held in the operative position. Further, when in the operative position the deadman handle 28 deflects elastically while the pin 36 is in the curved main portion of the guide slot 44. The pin 36 is therefore urged into the recess 48 as the deflection of the deadman handle 28 is released.

The facility for locking the control lever 20 is a major advantage of the present invention because the operator does not have to hold the lever in an operative position. This is particularly important where a considerable load must be exerted upon the control lever 20, as may be the case where the lever controls a clutch mechanism. The operator need only hold the deadman handle 28 in its operative position to lock the control lever 20. The arrangement is such that only a relatively small load is necessary to maintain the deadman handle 28 in its operative position.

The device of this invention satisfies the requirement that the lawnmower must be deactivated when the deadman handle 28 is released. Once the deadman handle 28 is released, the pin 36 is disengaged from the recess 48, which allows the control lever 20 to return to the rest position under its biasing force. Once in the rest position, in which the lawnmower is deactivated, the control lever 20 is locked by virtue of engagement of the pin 36 within the recess 46, as illustrated in FIG. 2.

A further feature of the device shown in FIGS. 2, 3 and 4 is a cable anchor 50 which connects the control lever 20 to an actuating cable 52. The actuating cable 52 is sheathed and the sheath can be attached to the casing of the control box 18.

The safety control device may accommodate more than one actuating cable and the movement of each cable as the control lever 20 is moved may be different. This facility can be achieved by careful selection of the spacing between the pivot 40 and the respective cable anchors 50. This feature is useful where two or more functions require simultaneous operation but the cable movements they require differ.

Figure 5:
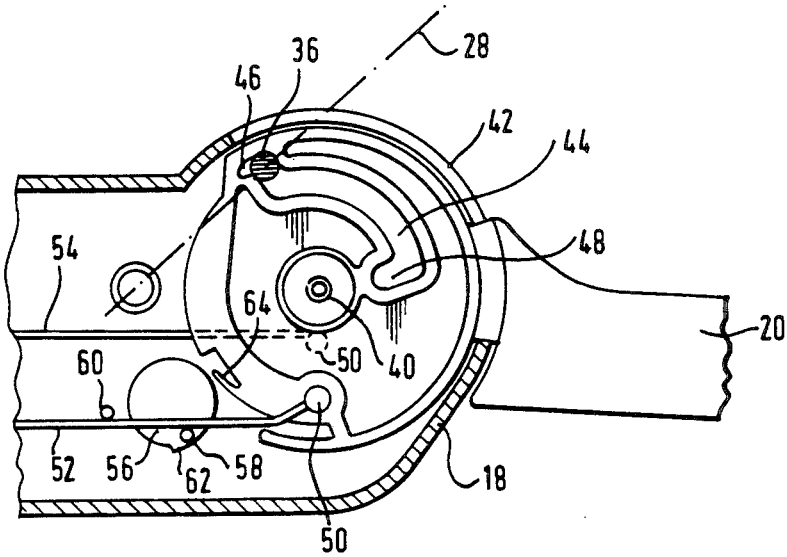
FIGS. 5 and 6 are schematic sectional side views showing the operation of a further aspect of this invention.
Figure 6:
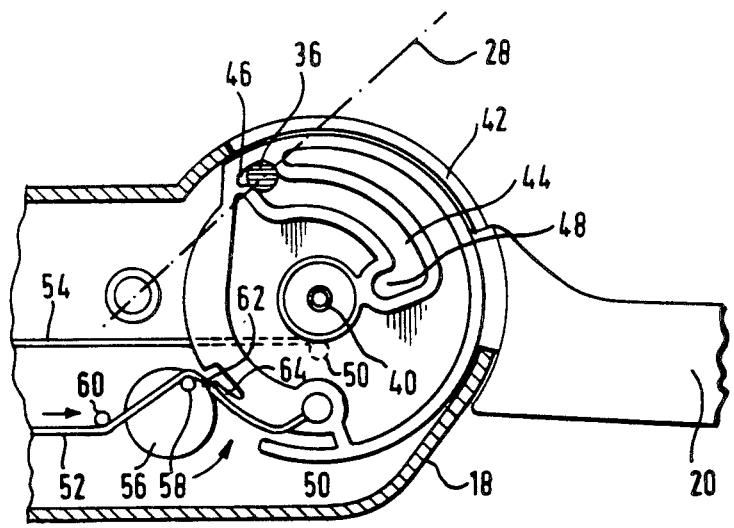

A two-cable control device for use with a lawnmower is shown in FIGS. 5 and 6. One actuating cable 52 operates a throttle device and the other actuating cable 54 operates a clutch/brake device. These cables are, as illustrated located on opposite sides of the handle with cable 54 disposed to follow a tangential path relative to the circular path it will follow relative to pivot points 40. In this was the cable will not be deflected in an angular path when the control handle is moved.

FIGS. 5 and 6 also show a preferred arrangement of the aforementioned throttle override 24. The throttle override 24 allows a partial throttle setting to be set and maintained without actuating the clutch/brake device and without moving the main control lever 20 from its rest position. This provision facilitates use of the lawnmower under cold-start conditions.

The throttle override 24 comprises a body 56 of generally circular section, which is pivotally mounted about its central axis to the control box 18. The body 56, which can be turned about its axis by the external knob illustrated in FIG. 1, is movable between an 'off' position shown in FIG. 5 and an 'on' position shown in FIG. 6.

A pin 58 is situated near the periphery of body 56. The body 56 is positioned within the control box 18 such that, in the 'off' position, the pin 58 lies adjacent the straight throttle cable 52. When moved to the 'on' position, the pin 58 acts to deflect the cable 52 about a fixed pin 60, thereby pulling the cable and actuating the throttle.

Inconveniently, the body 56 will tend to return to the 'off' position once the throttle override knob is released, because the cable 52 is under tension and will tend to straighten. In view of this, the throttle override 24 is latched in the 'on' position so that the operator can release the knob while leaving the override in operation. The latch is effected by engagement between a projecting tooth 62 on the body and a resilient flap 64 on the base of the control lever 20. The tooth 62 rides over and deflects the flap 64 as the body 56 approaches the 'on' position. Once in the 'on' position, the flap 64 snaps out behind the tooth 62 and prevents return movement of the body 56.

The engagement between the tooth 62 and the flap 64 is released when the control lever 20 is moved out of its rest position. The body 56 is then free to return to the 'off' position as the cable 52 straightens, which re-sets the throttle override 24 for future use.

As will be clear, an override device of the type described is generally applicable to any cable-type control device. The override device is particularly suitable for use with a control device used to control two or more functions, as it allows operation of one function with complete independence from the other function.

Many variations of the embodiments described are possible. For instance, there may be a plurality of recesses 48 spaced apart from one another so as to allow the control lever 20 to be locked into any of a variety of operative positions. Similarly, the throttle override 24 may have a plurality of teeth 62 spaced apart at the periphery of the body 56, this giving a plurality of 'on' positions each with a different throttle setting.

The lawnmower could be powered by an electric motor, in which case the control lever 20 may be a switch to start or stop the motor.

It is envisaged that with minor modifications the device described could be adapted to control electrical, pneumatic or hydraulic systems or could be used with non-cable mechanical linkages.

As will be clear to those skilled in the art, the device of this invention meets all requirements of the proposed legislation while allowing simple and comfortable operation. If desired, the internal combustion engine may be replaced by an electric motor.

I claim:

1. A safety control device comprising a movable control element linked to a deadman handle by a member carried by said deadman handle and which is movable relative to a guide slot, the guide slot coupled to said control element and the guide slot having at least one portion in which relative movement between the guide slot and the member is restricted.

2. A safety control device according to claim 1, wherein the guide slot has a first recess positioned such that, when the member is engaged therein, the control element is restrained in a non-operative position.

3. A safety control device according to claim 2, wherein the control element is biased towards its non-operative position.

4. A safety control device according to claim 2, wherein the deadman handle is biased towards a non-operative position and the biasing force acting upon the deadman handle acts to urge the member into the first recess.

5. A safety control device according to claim 1, wherein the guide slot has at least one second recess positioned such that, when the member is engaged therein, the control element is restrained in an operative position.

6. A safety control device according to claim 5 arranged such that the member is urged into second recess as a consequence of the deadman handle being held in an operative position.

7. A safety control device according to claim 1 wherein the member is a pin.

8. A safety control device according to claim 1 wherein the control element includes a lever mounted for movement about a pivot and wherein the guide slot is located on a portion of the control element.

9. A safety control device according to claim 8, wherein the guide slot is curved about the pivot.

10. A safety control device according to claim 1 wherein the guide slot is elongate and has a recess at each end, each recess defining said at least one portion.

11. A safety control device according to claim 1, wherein the control element acts upon a cable and the device further comprises an override arranged to deflect the cable in use.

12. A safety control device according to claim 11, further including latch means whereby the override can be latched in use.

13. A safety control device according to claim 12, wherein the latch means includes a generally circular body mounted on the control device, the circular body having a projecting tooth thereon, a portion of said control element carrying a resilient flap engagable with said tooth when the control element is in a rest position and wherein the latch means is arranged to release when the control element is moved into an operative position.

* * * * *